United States Patent [19]
Seymour

[11] 3,821,642
[45] June 28, 1974

[54] CORROSION MEASURING BRIDGE CIRCUIT HAVING AUTOMATIC CONTROLLED CONSTANT SOURCE OF ENERGY AND TEMPERATURE COMPENSATION

[75] Inventor: Edgar Wilson Seymour, Freeville, N.Y.

[73] Assignee: Ithaco Inc., Ithaca, N.Y.

[22] Filed: Nov. 30, 1972

[21] Appl. No.: 310,844

[52] U.S. Cl............ 324/65 CR, 323/9, 323/75 N, 324/DIG. 1
[51] Int. Cl............................................ G01r 27/02
[58] Field of Search....... 324/65 CR, DIG. 1; 323/9, 323/75 N

[56] References Cited
UNITED STATES PATENTS

| | | | |
|---|---|---|---|
| 2,824,283 | 2/1958 | Ellison | 324/65 CR |
| 2,883,620 | 4/1959 | Selby et al. | 324/DIG. 1 |
| 3,067,386 | 12/1962 | Freedman | 324/DIG. 1 |
| 3,104,355 | 9/1963 | Holmes et al. | 324/65 CR |
| 3,303,415 | 2/1967 | Barber | 323/9 |
| 3,305,763 | 2/1967 | Kupferberg et al. | 323/9 |
| 3,324,378 | 6/1967 | Kupferberg et al. | 323/9 X |
| 3,388,316 | 6/1968 | Gately | 323/9 |
| 3,463,999 | 8/1969 | Ames, Jr. | 323/75 N |
| 3,568,044 | 3/1971 | Elazar | 323/75 N |

Primary Examiner—Stanley T. Krawczewicz

[57] ABSTRACT

A controllable source of alternating current signals, for excitation of a bridge circuit used in apparatus such as corrosion analyzers and the like, includes an automatic amplitude control circuit to maintain the amplitude of the alternating current signals applied to the bridge circuit substantially constant for wide variations in the impedance of the bridge circuit. By maintaining the bridge circuit excitation substantially constant, the amplitude of the bridge circuit unbalance signals now provides an accurate indication bridge circuit unbalance and therefor the corrosion of a probe element connected in the bridge circuit.

10 Claims, 2 Drawing Figures

CORROSION MEASURING BRIDGE CIRCUIT HAVING AUTOMATIC CONTROLLED CONSTANT SOURCE OF ENERGY AND TEMPERATURE COMPENSATION

BACKGROUND OF THE INVENTION

This invention pertains in general to the excitation source for a bridge circuit providing automatic amplitude control and more particularly to a bridge circuit and an alternating current excitation source therefore for use in corrosion analyzers and the like.

Many industrial processes make use of corrosive material, particularly corrosive liquids and gases. The vessels, such as pipes and tanks, used to contain and convey such corrosive material are often under high pressure. It is therefore essential to monitor the rate of corrosion of the walls of such vessels in order to avoid the disastrous results of a vessel wall being weakened to the point of rupture. An accepted method of monitoring such corrosion is to make use of corrosion probes. A corrosion probe consists basically of a metal wire, or bar, which is made out of the same material as the vessel wall, and which is inserted through the vessel wall into the corrosive material. With a properly designed probe, the rate of corrosion of the probe and the vessel wall should be essentially identical. Since the effect of the probe corrosion is to reduce the cross section of the probe, the probe resistance increases as corrosion progresses. By using the probe resistance as one arm of a bridge circuit and electrically exciting the bridge circuit, the bridge circuit unbalance signals can be used to indicate the amount of corrosion. An instrument used in conjunction with such a bridge circuit to monitor corrosion rate is commonly known as a corrosion analyzer.

In the past, corrosion was usually measured by null balance techniques wherein a known arm in the bridge circuit is varied (manually or automatically through servo techniques) until the bridge circuit is balanced to produce a null signal. Null balance techniques were used to avoid the problems associated with the direct measurement of the bridge circuit unbalance signals, since the amplitude of the unbalance signals depends upon the magnitude of the excitation potential or signals applied thereto, as well as the amount of bridge circuit unbalance. The accuracy to which such measurements can be made is determined primarily by the degree to which bridge circuit can be balanced (the signal null achieved). The manual types of null balance corrosion analyzers have the obvious disadvantage of requiring operators. The automatic servo driven types of null balance corrosion analyzers are expensive and have the usual inherent problems associated with servo driven parts, such as, dead band, instability, friction, noise sensitivity, wear, etc.

In order to achieve greater sensitivity, thin wire or foil type probes were generally used. The thin wire or foil type probes have a higher resistance value and provide a greater resistance change per degree of corrosion than the thicker probes. However, the thin wire or foil probes generally do not tend to corrode uniformly and therefore introduce errors in corrosion measurements. Furthermore, the thin wire or foil type probes require frequent replacement. Thicker probes are preferred since they greatly extend the useful life of the probes and also provide a larger exposed surface over which the effect of the corrosion is averaged, resulting in a more accurate indication of actual corrosion.

In corrosion measurements, the primary interest is generally corrosion rate rather than total corrosion. Changes in corrosion should be measured to an accuracy of a fraction of a percent and should be repeatable between measurement periods, such as daily. The problems concerned with making accurate measurements is compounded by the use of the thicker type probe due to its inherent low resistance, often in the order of only a few milliohms. In some cases, when the thicker probe is connected in a bridge circuit, the resistance of the wires connecting the source of excitation to the bridge circuit may approach, or be greater than, the total resistance of the bridge circuit. In these cases, the wires act as voltage dividers wherein changes in the total bridge circuit resistance due to corrosion and temperature changes, etc., result in changes in the amplitude of bridge circuit excitation signals. Since the amplitude of the unbalance signals from a bridge circuit is a function of the amplitude of the excitation signals applied thereto as well as the amount of bridge circuit unbalance, any change in bridge circuit excitation will tend to introduce errors in the measurements. Hence, in the prior art, to avoid the problems associated with the thicker, low resistance, probes, the higher resistance thin wire or foil probes were used, thereby sacrificing probe life and accuracy.

In addition to the foregoing, very often it is not possible to choose a probe material having ideal temperature compensating characteristics. As previously mentioned, the probe should preferably be made of the same material as the vessel being monitored. For example, if the vessel is made of carbon steel, the probe should also be made of carbon steel, which is known to have a resistance characteristic that varies widely with temperature changes. Hence, with a bridge circuit having a thick carbon steel probe (that may exhibit a low resistance of only several milliohms) changes in resistance due to temperature variations alone can introduce changes in total bridge resistance in order of milliohms.

The problem associated with bridge circuit unbalance due to temperature changes was largely solved by including two arms of the bridge circuit in the probe and inserting both arms into the corrosive medium, the additional arm being coated with a non-corrosive material. The coated arm functions to compensate for bridge circuit unbalance due to resistance changes as a result of temperature variations. However, the total resistance of the entire bridge circuit as viewed by the excitation source still changes with temperature, and if the impedance of the source is not negligible, the amplitude of excitation signals applied thereto also changes. As a result, although the bridge circuit balance will not be affected by temperature changes, the amplitude of the unbalance signals is still a function of the amplitude of the excitation signals and therefore changes with temperature. Hence, either the null balance technique must be used to minimize the effect of the changes in excitation signal amplitude, or else the amplitude of the excitation signals must be kept constant despite variations in total bridge impedance. With direct current bridge excitation a low impedance battery can be used, provided that the total impedance of the battery and the lead wires is negligible compared to the total impedance of the bridge circuit. If the total impedance of the bridge is very low, such as in the case of a bridge circuit employing the thickest probes, then the impedance of the battery must be very low and the size of the wires very large. This presents an expensive approach if attempting to monitor corrosion by remote control.

The use of alternating circuit excitation for bridge circuits has the advantage of providing isolation between the measuring circuit and the vessel being monitored by means of transformer or capacitor coupling, and also eliminates the drift problems. However, it is expensive and impractical to provide a brute force type alternating current supply that will maintain the amplitude of the excitation signals substantially constant with large variation in total bridge impedance. The 60 hertz mains are not used to provide the excitation signals because of stray signal pickup that will limit the accuracy of measurements, particularly in the case of the long lines used in remote monitoring. As in the case of direct current excitation, the resistance of the lead wires also becomes a problem in the low impedance bridge circuits and particularly so when used in a remote control arrangement. If the total impedance of the bridge circuit remained constant, the problem with the resistance of the lead wires could be solved by the use of a current drive type of alternating current power source, particularly in the case of the low impedance bridge circuits. However, since the total impedance of the bridge circuit varies (with temperature and unbalance due to corrosion) a current source can not be used without changing bridge excitation and therefore introducing errors in the amplitude of the bridge circuit unbalance signals. On the other hand, because of the low impedance of bridge circuits (in the order of milliohms) a voltage drive also cannot be effectively used. As a result, in order to be able to measure corrosion accurately by monitoring the amplitude of the bridge circuit unbalance signals, the source of excitation for the bridge circuit is required to function as psuedo a current source by providing a constant current flow through the bridge circuit (thereby minimizing the effect of lead resistance) and also as a psuedo voltage source by maintaining the amplitude of the excitation signals across the bridge circuit constant with variation in total bridge impedance. In addition to the foregoing, the source of excitation should also be adaptable for local and remote control and still provide the constant amplitude excitation signals to the bridge circuit.

It is therefore an object of this invention to provide a new and improved method of accurately measuring bridge circuit unbalance.

It is also an object of this invention to provide a new and improved source of energization for bridge circuits that maintains the amplitude of the energization signals applied thereto substantially constant for a wide range of bridge impedances.

It is also an object of this invention to provide a new and improved source of energization for bridge circuits that applies alternating current signals to the bridge circuit that are substantially constant in amplitude for wide variations in bridge impedance.

It is a further object of this invention to provide a new and improved source of energization for use with high and low impedance bridge circuits that applies a substantially constant amplitude of excitation signals to the bridge circuit over wide variations in bridge circuit impedance.

It is also an object of this invention to provide a new and improved source of energization signals for bridge circuits that maintains the amplitude of energization signals applied to the bridge circuit substantially constant for various lead lengths so that the source is readily adaptable for remote control arrangements.

It is also an object of this invention to provide a new and improved method of measuring corrosion.

It is a still further object of this invention to provide a new and improved corrosion analyzer for use with bridge circuits for measuring corrosion.

It is also an object of this invention to provide a new and improved corrosion analyzer for converting bridge circuit unbalance signals into an accurate indication of corrosion without the use of moving parts.

It is another object of this invention to provide a new and improved corrosion analyzer that applies alternating current excitation signals to a bridge circuit and converts alternating current electrical signals corresponding to bridge circuit unbalance into an accurate indication of corrosion.

It is another object of this invention to provide a new and improved corrosion analyzer that maintains the excitation signals applied to a bridge circuit substantially constant for wide variations in bridge circuit impedance and converts the electrical signals corresponding to bridge circuit unbalance to an indication of corrosion.

It is another object of this invention to provide a new and improved corrosion analyzer that applies alternating current excitation signals to a bridge circuit and uses alternating current coupling arrangements to provide isolation between the measuring circuits and the vessel being monitored.

It is another object of this invention to provide a new and improved corrosion analyzer that is readily adaptable for local and remote monitoring.

BRIEF DESCRIPTION OF THE INVENTION

Bridge circuit unbalance is accurately measured by maintaining the energization potential across the bridge circuit constant for wide variations in bridge impedance and by converting the amplitude of the bridge circuit unbalance signals into an indication of bridge circuit unbalance.

A source of energization signals for bridge circuits includes a controllable source of alternating current signals that is responsive to a control signal to control the amplitude of the alternating current signals applied to the bridge circuit. Amplitude control means detects the amplitude of the alternating current signals applied to the bridge circuit and controls the output of the source to maintain the amplitude of the energization signals applied to the bridge circuit substantially constant for wide variations in bridge circuit impedance. Hence, the amplitude of the excitation signals applied to the bridge circuit is held constant despite changes in total bridge circuit impedance due to temperature variations bridge circuit unbalance, etc. As a result, the amplitude of bridge circuit unbalance signals can now be used to provide an accurate indication of the amount of bridge circuit unbalance.

In accordance to a second feature of the invention, the bridge circuit in conjunction with the automatic amplitude excitation control system can be employed with corrosion analyzers. The bridge circuit unbalance signals are detected to provide a direct current signal that is an accurate indication of bridge circuit unbalance and therefore the corrosion of the probe elements in the bridge circuit.

The bridge excitation system with automatic amplitude control overcomes the problems associated with lead resistance and source impedance and thereby allows the use of the corrosion analyzer for the local and remote monitoring of corrosion.

Since the bridge circuit is energized by an alternating current source, the detection circuit, according to another feature of the invention, can include a narrow bandwidth amplifier and a synchronous detector to provide excellent signal to noise ratio.

Alternating current detection and energization also allows the use of transformer and/or capacitance coupling to provide isolation between the vessel and the measuring circuit.

BRIEF DISCRIPTION OF THE FIGURES

DETAILED DISCRIPTION OF THE INVENTION

Figure 1:
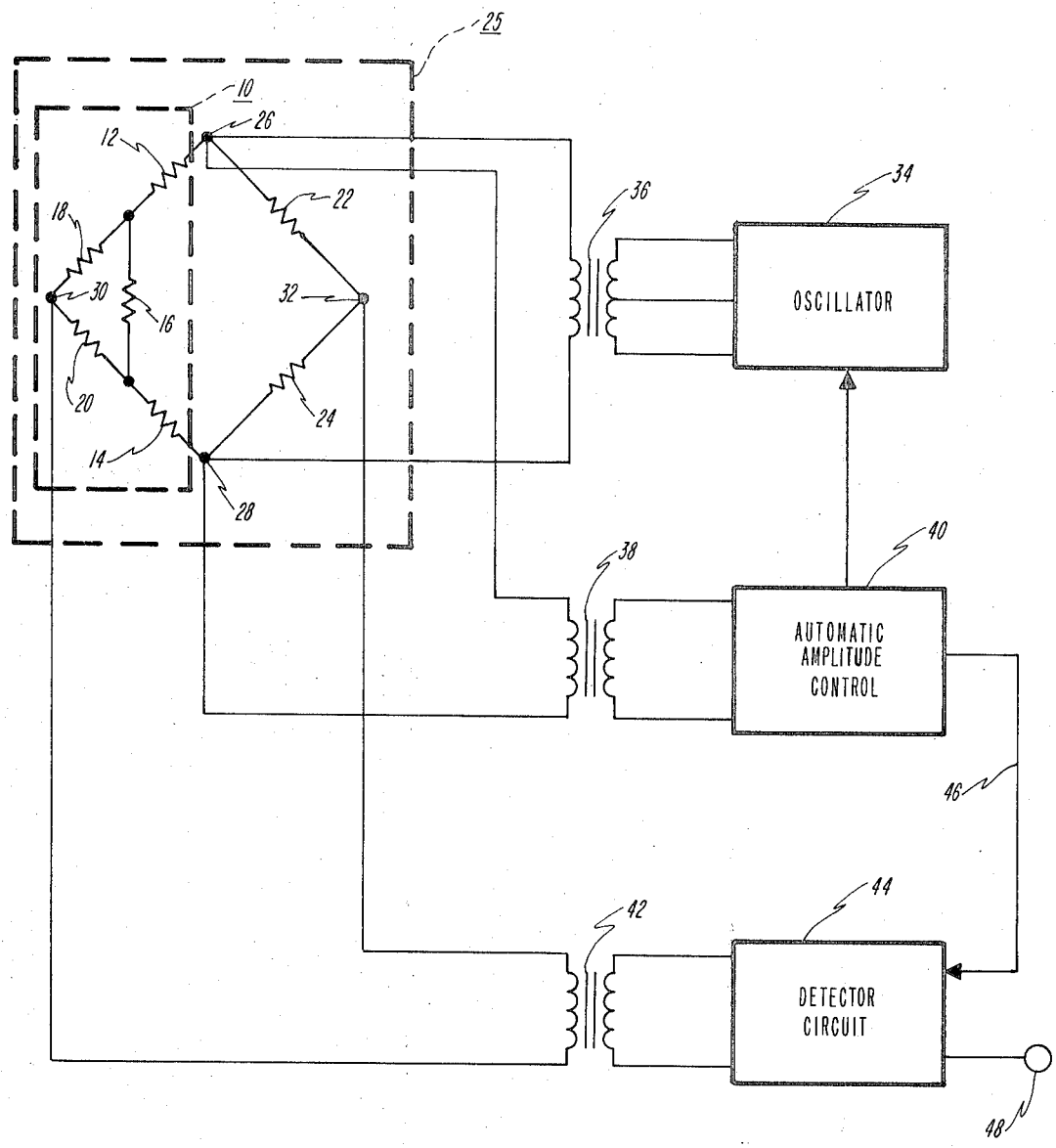
FIG. 1 is a block diagram of a corrosion analyzer including the invention.

A probe 10 for measuring corrosion and the like is illustrated as including five resistors 12 – 20. The resistor 12 functions as the active arm of the probe to be inserted into corrosive medium wherein its resistance varies as a function of its corrosion. The resistor 14 is a temperature compensating element made of the same material as the active resistor 12 and is placed in close proximity to it. The temperature compensating resistor 14 is coated with an inert substance not subject to the medium. The change in the resistor 14 due to changes in temperature is the same as the change in the resistor 12, thereby providing a temperature compensating factor. The resistors 16 – 20 represent the intrinsic resistances of the probe. The one end of each of the resistors 12 and 14 is connected to the series resistors 22 and 24 to form a bridge circuit 25 similar to a Kelvin double bridge circuit, and hence eliminate errors due to contact and lead resistance.

A variable source of excitation, such as a voltage controlled oscillator circuit 34, is connected across the bridge junctions 26 and 28, via a transformer 36. The alternating current (A C) signals developed across the bridge circuit junctions 26 and 28 is transmitted by a transformer 38 to an automatic amplitude control circuit 40. The output control signal of the automatic amplitude control circuit 40 is a function of the amplitude of the AC excitation signals across the junctions 26 and 28, and is applied to the oscillator 34 in a manner so that the amplitude of AC excitation signals across the junctions 26 and 28 is maintained substantially constant despite large variations in total bridge circuit resistance. Any unbalance in the bridge circuit 25 due to the corrosion of the active resistor 12 produces an AC signal across the junctions 30 and 32 which is transmitted by a transformer 42 to a detector circuit 44. A signal from the automatic amplitude control circuit 40 is applied to the detector circuit 44 via line 46 to provide a reference signal for synchronous detection. The detector circuit 44 provides a DC output signal (at a terminal 48) having a magnitude which is a function of the bridge unbalance due to the corrosion of resistor 12.

Figure 2:
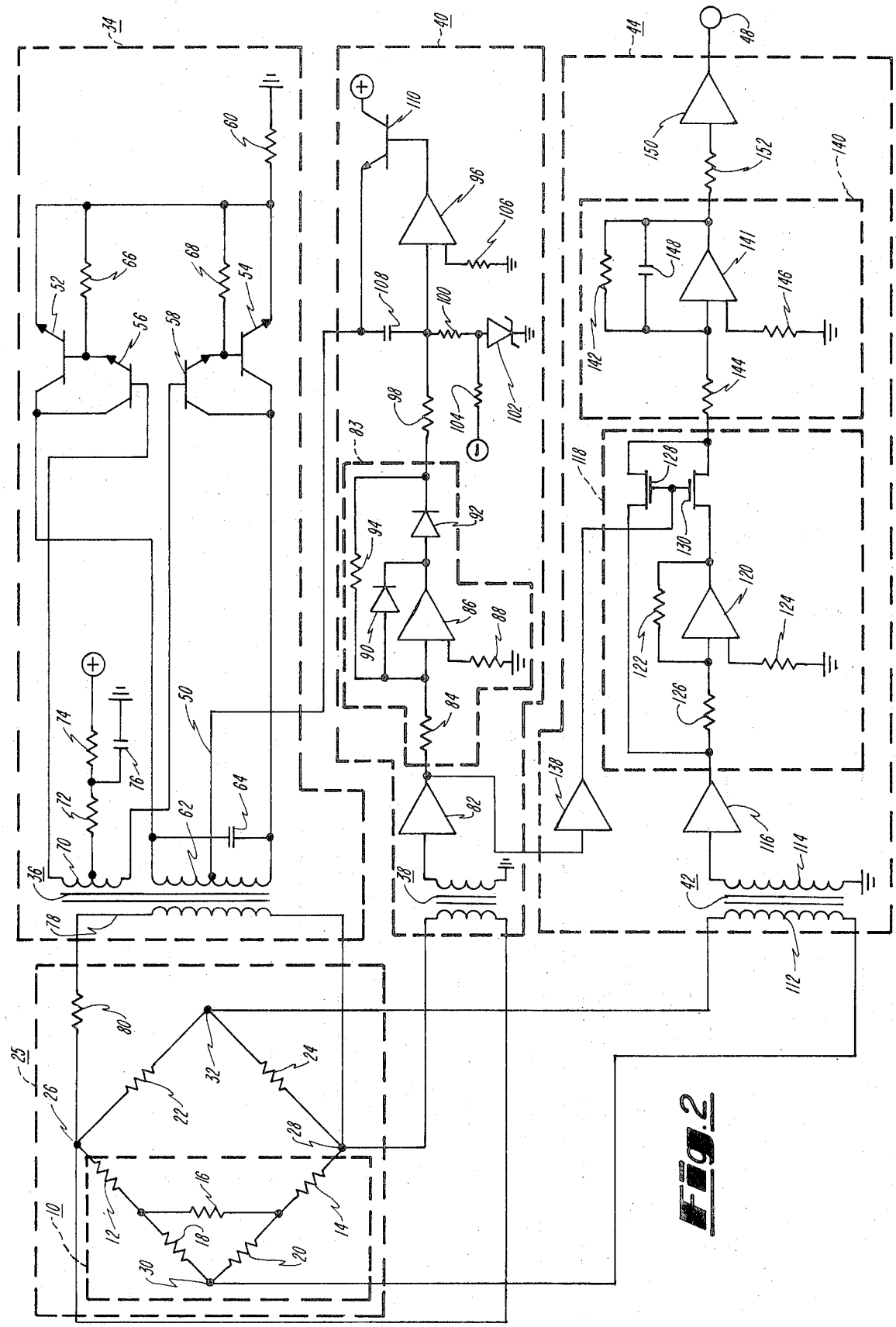
FIG. 2 is an electrical schematic diagram of the corrosion analyzer of FIG. 1.

Referring now to FIG. 2, the oscillator circuit 34 is a class C push pull type of oscillator circuit that produces a variable amplitude output signal that is a function of the magnitude of DC energizing potential supplied thereto from the automatic amplitude control circuit 40 via a line 50. The oscillator circuit 34 includes four transistors 52 – 58, wherein the transistors 56 and 58 provide the base drive for the transistors 52 and 54 in a "Darlington" type configuration. The emitters of the transistors 52 and 54 are connected to ground via a resistor 60, while the collectors are connected to opposite ends of a primary winding 62 of the transformer 36. A capacitor 64 is connected across the primary winding 62 so that a tank circuit consisting of primary winding 62 and the capacitor 64 determines the frequency of oscillation. Biasing resistors 66 and 68 are connected between the resistor 60 and the bases of the transistors 52 and 54, respectively. The bases of the transistors 56 and 58 are connected to opposite ends of a secondary winding 70, the center tap of which is connected to a positive DC power source via resistors 72 and 74. The combination of the resistors 60, 66, 68, 72 and 74 form the bias circuit for the transistors. A capacitor 76 is connected between the junction of the resistors 72 and 74 and ground to clamp the center tap of the winding 70 to the ground. The winding 70 is wound to provide the regenerative feedback circuit for sustaining oscillation. The frequency of oscillation selected depends upon items such as magnetic and capacitive pickup, distortion, unsymetrical voltage spikes, signal fed through and phase shift errors, the size of magnetic core of the transformer, and inductance and capacitance limitations. It was found that a frequency of 35 hertz appeared to be optimum. The secondary winding 78 of the transformer 36 is connected to the junctions 26 and 28 of the bridge circuit 25 to supply AC excitation signals thereto. The resistor 80 is connected in series with the secondary winding 78 to minimize the effect of variations of lead resistance and also for limiting current in case of a short.

The excitation signals developed across the bridge circuit 25 are applied to an AC amplifier 82 in the automatic amplitude control circuit 40 via the transformer 38. The amplified signals are applied to a detector circuit 83. The detector circuit includes a DC amplifier 86, diodes 90 and 92 and resistors 84, 88 and 94 connected in the manner to rectify the amplified bridge circuit unbalance signals applied thereto and to apply a corresponding DC potential to the summing node of an amplifier 96 via a resistor 98. A reference potential is applied to the same summing node of amplifier 96 via a reference circuit including a resistor 100 connected to ground through a zener diode 102 and to a negative DC power source through a resistor 104. The other node of the amplifier 96 is connected to ground through a resistor 106. A capacitor 108 is connected between the summing node and the line 50 to filter the detected half wave output signals from the detector circuit 83. The output of the amplifier 96 is connected to the base of a control transistor 100. The collector and emitter of the control transistor 100 are connected between a positive power source and the line 50.

The amplifier 96 is a very high gain, low bias current, operational amplifier wherein the bias current flowing into the summing node of the amplifier 96 is negligible. Hence, in a steady state condition, the current flowing through the resistors 98 and 100 should be equal and opposite. Assume that the amplitude of the AC excitation signals across the junctions 26 and 28 is such that current flowing through the resistor 98 is less than the current flowing through the resistor 100. The output from the amplifier 96 increases in a direction to render the control transistor 110 more conductive, which in turn, makes the potential applied to the line 50 become more positive. The voltage on the line 50 will increase towards a more positive value until the amplitude of the oscillator 34 output signals (and hence the amplitude of the AC excitation signals across the junctions 26 and 28) increases to a value such as to make the current through resistors 98 and 100 equal. As soon as the current flow through the resistors 98 and 100 becomes equal, the output voltage from the amplifier 96 no longer changes. Since the current flow through the resistor 100 is kept constant by means of the zener diode 102, the current flow through the resistor 98 will remain constant and the AC exitation signals applied across the junctions 26 and 28 will remain constant regardless of the variations in the total resistance of the bridge circuit impedance.

The AC signal across the junctions 30 and 32 due to bridge circuit unbalance is sensed by a primary winding 112 of the transformer 42. When the bridge circuit 25 is perfectly balanced, the voltage across junctions 30 and 32 is zero. The secondary winding 114 is connected to apply the bridge circuit unbalance signals to an AC amplifier 116 that is tuned to pass the frequency of the oscillator circuit 34. The output of the amplifier 116 is synchronously detected by a detector circuit 118. The detector circuit 118 includes a direct current amplifier 120 including a feedback resistor 122 and a bias resistor 124. Input signals from the amplifier 116 are transmitted to the amplifier 120 through a resistor 126 and are also applied to the drain of a MOS field effect transistor 128. The output circuit of the amplifier 120 is connected to the drain of a second MOS field effect transistor 130. The respective gates, and the respective sources, of the transistors 128 and 130 are connected together. Reference signals for synchronous detection are picked off from the output of the amplifier 82 and applied to the bases of the transistors 128 and 130 via an amplifier 138. The phase sensitive synchronous detector circuit 118 provides direct current output pulses that have a magnitude that is a function of the amplitude of the AC bridge circuit unbalance signals across the junctions 30 and 32. The output from the detector circuit 118 is applied to a integrating circuit 140 including a DC amplifier 141, resistors 142 – 146 and a capacitor 148, to provide a filtered DC signal having a magnitude that is a linear function of the bridge circuit 25 unbalance. The output from the integrating circuit 140 is applied through a resistor 152 to a DC amplifier 150 to provide a output signal at the terminal 48 that is a linear function of the corrosion of the resistor 12.

As can be seen in FIGS. 1 and 2, the corrosion analyzer accurately measures corrosion by converting the bridge circuit unbalance signals into a direct current signal, the magnitude of which is only a function of the bridge circuit unbalance. The accuracy of the corrosion measurement therefore depends upon the accuracy by which the change in the resistance 12 is measured. The amplitude of the bridge circuit unbalance signals from the bridge circuit 25 is determined (ignoring the intrinsic resistances 16 – 20) as follows:

$$Vbo = (VEX) \; R14/R12 + R14 - R24/R22 + R24$$

where: $Vbo$ = the amplitude of bridge circuit unbalanced signals across junctions 30 and 32, and
$VEX$ = the amplitude of bridge circuit excitation signals across junctions 26 and 28

The amplitude of the bridge circuit unbalance signals $Vbo$ is amplified and detected by the corrosion analyzer to produce a measurement of corrosion. Without the bridge circuit excitation system of the invention, any change in the amplitude of bridge circuit excitation (with the bridge unbalanced) will produce an error, possibly indicating corrosion where the was none, or indicating less corrosion then actual. The bridge excitation system of the invention maintains the amplitude of the bridge circuit excitation signals ($VEX$) constant regardless of variations in the total bridge circuit impedance. For example, the bridge excitation system of the invention maintains the amplitude of the excitation signals ($VEX$) across the bridge circuit substantially constant for at least a 600 percent change in the total impedance of the bridge circuit. The bridge circuit excitation source of the invention functions as a psuedo voltage and current drive capable of properly energizing a very low impedance bridge circuit and maintaining the amplitude of the excitation signals substantially constant for large variations in bridge circuit impedance. Hence, with the bridge excitation system of the invention, the amplitude of bridge circuit unbalance signals ($Vbo$) can now be used directly to produce an accurate indication of corrosion. There is no need to resort to the null balance the techniques of the prior art.

The bridge excitation system of the invention also allows the use of AC excitation signals for the bridge circuit which eliminates errors due to the thermocouple effects and also allows the use of AC measuring circuits thereby eliminating the drift problems generally associated with DC circuits. As illustrated in FIGS. 1 and 2, the amount of bridge circuit unbalance (corrosion) is now determined by AC circuit techniques. The detector circuit consisting of the amplifiers 118 and 140 acts as a tuned circuit exhibiting a bandwidth in the order of 0.01 hertz. The narrow bandwidth provides for excellent noise rejection, at least equivalent to that available with DC circuity. The use of phase-sensitive synchronous detection allows the accurate detection of bridge circuit unbalance signals by eliminating problems due to random noise and thereby providing a greater signal to noise ratio. A further advantage of the AC bridge circuit excitation and unbalance signal measurement technique of the invention is that isolation between the vessel and the measuring circuits can be readily achieved through the use of the transformers 36, 38 and 42. With the corrosion analyzer of FIGS. 1 and 2, corrosion rate measurements can be made on a repeatable basis to an accuracy of a fraction of a percent. The system was found to operate properly with bridge circuits that exhibit very low impedance, such as, for example, 10 milliohms or less, and therefore allows the use of large cross section type probes for greater life and more accurate reading of corrosion. In addition, it is not necessary that the probe material exhibit reasonable temperature - resistance characteristics since the total bridge resistance can vary widely without effecting the accuracy of the measurements. In addition to the foregoing, the effect of lead resistance on bridge circuit excitation is minimized so that the analyzer can be used for remote and local operation.

I claim:

1. A corrosion analyzer for use with a corrosion probe, the elements of which are connected to a bridge circuit, said corrosion analyzer comprising:

a controllable source of alternating current signals connected to apply alternating current signals across a pair of opposite junctions of the bridge circuit, said controllable source being responsive to a control signal applied thereto to control the amplitude of the alternating current signals applied to the bridge circuit;

amplitude control means, connected between said opposite junctions of said bridge circuit and said source, responsive to the amplitude of alternating current signals applied to said opposite junctions to apply said control signal to said source to maintain the amplitude of the alternating current signals across said pair of opposite junctions of the bridge circuit substantially constant, and circuit means for converting the alternating current signals developed across another pair of bridge circuit junctions opposite those connected to said source to an output signal that is a function of bridge circuit unbalance as a result of the corrosion of an element of said probe.

2. A corrosion analyzer as defined in claim 1 wherein:

said controllable source is a oscillator circuit that is response to a direct current control signal applied thereto to control the amplitude of oscillation.

3. A corrosion analyzer as defined in claim 2 wherein said amplitude control means includes:

detection circuit means for detecting the alternating current signals applied to the bridge circuit to produce said direct current control signal, the magnitude of which, is a function of the amplitude of the alternating current signals.

4. A corrosion analyzer as defined in claim 3 wherein said amplitude control means includes:

circuit means for providing a direct current reference signal, and a summing circuit summing the direct current reference signal with a detected direct current signal from the detection circuit means to produce said direct current control signal.

5. A corrosion analyzer as defined in claim 4 wherein:

said oscillator is a push-pull semiconductor oscillator circuit connected to drive the primary winding of a transformer, the secondary winding of which is, connected to the bridge circuit, and wherein said direct circuit control signal is applied to a center tap of said primary winding to apply an energization potential to the oscillator circuit.

6. A corrosion analyzer as defined in claim 5 wherein said conversion circuit means includes:

a narrow bandwidth tuned amplifier, tuned to the output frequency of the oscillator, and connected to receive input signals from said another pair of bridge circuit junctions, a synchronous detector circuit, connected to receive reference signals having the frequency of said oscillator signals for detecting the output signals from said tuned amplifier, and an integrating circuit connected to the output of said synchronous detector circuit.

7. A method of measuring corrosion comprising the steps of:

inserting an electrically conductive element in a corrosive medium wherein the corrosion of the element changes its impedance;

connecting said element in a bridge circuit;

applying electrical energization signals to a first pair of opposite junctions of the bridge circuit in a manner so that magnitude of the energization signals applied thereto remains substantially constant for variations in bridge circuit impedance due to temperature variations and bridge circuit unbalance, and converting the amplitude of the unbalance signals of said bridge circuit across a second pair of bridge junctions, opposite said first pairs of junctions, into an indication of corrosion of said element.

8. A method as defined in claim 7 wherein said applying step includes:

providing a controllable source of energization signals, the magnitude of which is a function of a control signal applied thereto;

applying signals from said source across said first pair of junctions for energizing said bridge circuit;

detecting the magnitude of the energization signals applied across said first pair of junctions to provide a control signal, and applying said control signal to said controllable source so that the magnitude of the energization signal applied across said first pair of junctions remains substantially constant for variations in bridge circuit impedance.

9. A method as defined in claim 8 wherein:

said applying step applies alternating current energization signals, and said converting step converts the alternating current unbalance signals into a direct current signal that is a function of the corrosion of said element.

10. A method as defined in claim 9 wherein said converting step includes:

transmitting a narrow band of signals frequencies centered about said alternating current energization signals, and synchronously detecting the narrow band of signal frequencies to produce a direct current signal, the magnitude of which is an indication of the corrosion of said element.

* * * * *